(12) United States Patent
Little

(10) Patent No.: US 7,784,261 B2
(45) Date of Patent: Aug. 31, 2010

(54) COMBINED CYCLE POWER PLANT

(75) Inventor: David A. Little, Chuluota, FL (US)

(73) Assignee: Siemens Energy, Inc., Orlando, FL (US)

( * ) Notice: Subject to any disclaimer, the term of this patent is extended or adjusted under 35 U.S.C. 154(b) by 1133 days.

(21) Appl. No.: 11/440,838

(22) Filed: May 25, 2006

(65) Prior Publication Data

US 2007/0271898 A1 Nov. 29, 2007

(51) Int. Cl.
F02C 3/16 (2006.01)
F02C 6/18 (2006.01)

(52) U.S. Cl. .................. 60/39.182; 60/735
(58) Field of Classification Search ............ 60/735, 60/39.182
See application file for complete search history.

(56) References Cited

U.S. PATENT DOCUMENTS

| | | | |
|---|---|---|---|
| 2,638,741 A * | 5/1953 | Putman, Jr. | 60/735 |
| 4,197,700 A * | 4/1980 | Jahnig | 60/735 |
| 4,272,953 A | 6/1981 | Rice | |
| 4,813,227 A | 3/1989 | Rice | |
| 5,133,182 A | 7/1992 | Marcos | |
| 5,839,267 A * | 11/1998 | Schonewald et al. | 60/39.182 |
| 6,463,729 B2 * | 10/2002 | Magoshi et al. | 60/39.182 |
| 6,619,026 B2 * | 9/2003 | Carelli et al. | 60/735 |
| 6,691,519 B2 | 2/2004 | Little | |
| 6,796,130 B2 * | 9/2004 | Little et al. | 60/805 |
| 6,840,049 B2 * | 1/2005 | Ziegner | 60/735 |
| 7,364,404 B2 * | 4/2008 | Guemmer | 416/91 |
| 2001/0047648 A1 * | 12/2001 | Griffiths | 60/735 |
| 2004/0025495 A1 | 2/2004 | Dev | |
| 2004/0112039 A1 | 6/2004 | Koganezawa et al. | |

OTHER PUBLICATIONS

Merchant et al., "Aerodynamic Design and Analysis of a High Pressure Ratio Aspirated Compressor Stage", ASME Paper 2000-GT-619, pp. 1-10.*

Dr. Thomas Beutner, AFOSR/NA and Dr. Steven Walker; Aspirated Compressor Will Reduce Size of Jet Engines, Jul.-Aug. 2000.

(Continued)

Primary Examiner—Ted Kim

(57) ABSTRACT

A combined cycle power plant (10) that is optimized to reduce total life cycle cost rather than only thermal efficiency. A steam bottoming cycle (16) is fed with exhaust gas (14) from a gas turbine topping cycle (12). The topping cycle incorporates multiple stages of combustion in order to maintain a desired high temperature of the exhaust gas being delivered to the bottoming cycle while at the same time avoiding peak combustion temperatures that would produce undesirable levels of NOx emissions. Accordingly, no post-combustion exhaust gas treatment is needed. In one embodiment, an aspirated compressor (36) provides compressed air to a torus-configured combustion chamber (20) that is integrated with a first stage of vanes (22), and a plurality of stages of in-situ reheat combustion (26, 28) are utilized. In other embodiments, torus-configured combustion chambers may be utilized for more than one of the stages of combustion.

9 Claims, 2 Drawing Sheets

OTHER PUBLICATIONS

"Single-Stage, 3.4:1-Pressure-Ratio Aspirated Fan Developed and Demonstrated"; [online]; [retrieved on Oct. 17, 2005; 7 pages; Retrieved from https://www.lerc.nasa.gov/WWW/RT/2003/5000/5810braunscheidel.html.

"General Electric T58-GE-8F Turboshaft"; [online]; [retrieved on Oct. 17, 2005; 3 pages; Retrieved from http://www.turbokart.com/about_t58.htm.

D.M. Bachovchin, T.E. Lippert, R.A. Newby and P.G.A. Cizmas (Texas A&M); Gas Turbine Reheat Using In Situ Combustion; Prepared for U.S. Department of Energy DOE/NETL Contract No. DE-FC26-00NT40913; May 17, 2004; Final Report (Draft).

* cited by examiner

COMBINED CYCLE POWER PLANT

FIELD OF THE INVENTION

This invention relates generally to the field of power production, and more particularly to a combined cycle power plant incorporating a gas turbine topping cycle and a steam turbine bottoming cycle.

BACKGROUND OF THE INVENTION

It is well known to utilize the waste heat generated by a gas turbine topping cycle to power a steam turbine bottoming cycle in a combined cycle power plant in order to augment the efficiency of an electrical power generating station. U.S. Pat. No. 4,272,953 describes a combined cycle plant wherein the topping cycle includes a gas turbine engine followed by a reheat combustor wherein the exhaust from the gas turbine engine is further heated prior to its introduction into a power turbine that is used to drive an electrical generator. Exhaust from the power turbine is then passed to an evaporator for generating steam for the steam bottoming cycle that is used to drive a second electrical generator. The '953 patent further describes a preferred embodiment wherein the reheat combustor takes the form of a combined reheat/superheat cavity that functions not only to reheat the combustion gas but also includes superheating coils for adding heat energy to the steam produced in the evaporator prior to its introduction into the steam turbine. Table II of the '953 patent predicts that overall plant efficiencies of about 50% are possible with the preferred embodiment in a plant producing about 95,000 KW.

BRIEF DESCRIPTION OF THE DRAWINGS

The invention is explained in following description in view of the drawings that show.

DETAILED DESCRIPTION OF THE INVENTION

Whereas the designs of prior art power plants were generally focused on maximizing the thermal efficiency of the plants, the present inventor has discovered that prior art designs do not necessarily minimize the total life cycle cost (LCC) of the plants; e.g. the total time-valued cost of producing power over the life of a power plant. An improved combined cycle power plant 10 is described herein that not only provides a high level of thermal efficiency, but importantly also is predicted to provide a lower total LCC than prior art plants of a similar capacity.

Important parameters that affect the total life cycle cost of an electrical power generating station include not only the fuel cost, which is directly related to thermal efficiency, but also manufacturing cost, repair/maintenance cost, and non-fuel operational costs. One important non-fuel operational cost may be the cost of post-combustion exhaust gas treatment, such as the cost of providing the ammonia that is consumed in a selective catalytic reduction (SCR) treatment process.

The present inventor has recognized several limitations of prior art combined cycle power plants that tend to increase the plants' total life cycle costs. First, designs that optimize thermal efficiency tend to have very high manufacturing costs. For example, prior art U.S. Pat. No. 4,272,953 teaches at column 14, line 63 through column 15, line 13, that it is desirable to utilize a high power turbine expansion ratio, since expansion ratio is a measure of the over-all efficiency of a power generating system. To achieve a high expansion ratio in the turbine, a high compression ratio air compressor is utilized; for example, the nineteen-stage compressor illustrated in FIG. 2 of that patent. The present inventor has avoided such complicated designs in the improved plant of FIG. 1 in order to reduce the initial manufacturing cost as well as the maintenance/repair costs. In a further example, the reheat/superheat cavity of the '953 patent is described as having a required diameter of about 10 feet. The present inventor has purposefully avoided such large structures in order to avoid the excessive manufacturing costs associated with such structures.

Figure 1:
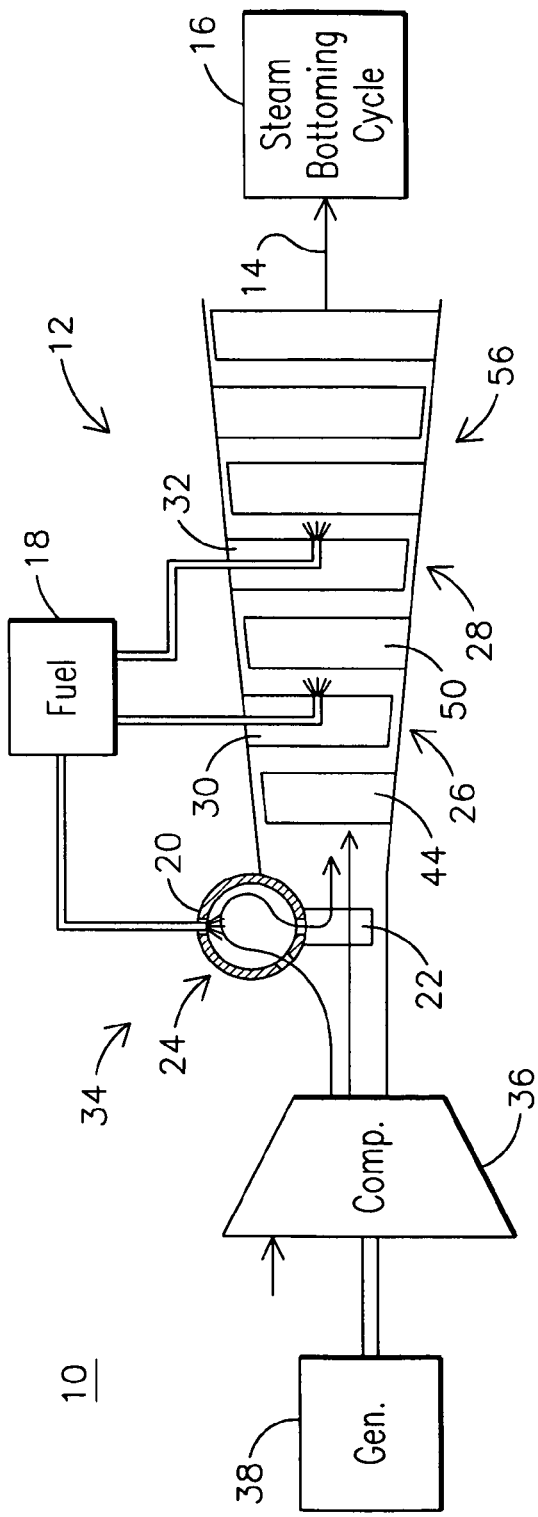
FIG. 1 is a schematic illustration of an improved combined cycle power plant.

The combined cycle power plant 10 of FIG. 1 includes a combustion gas topping cycle 12 for combusting a fuel 18 to produce shaft power and providing a flow of exhaust gas 14 to a steam bottoming cycle 16. The bottoming cycle 16 may be any such cycle known in the art that extracts heat from the exhaust gas 14 to produce additional shaft power. It is known that maintaining the incoming exhaust gas 14 at a temperature of about 625-650° C., and preferably about 640° C., may enhance cycle efficiency in such a steam bottoming cycle 16. However, such an elevated exhaust temperature typically requires a relatively high firing temperature in the topping cycle 12, thereby creating conditions that favor the production of undesirable levels of oxides of nitrogen (NOx) in the exhaust gas 14. Such emissions are minimized in the prior art either by exotic and expensive combustor designs and/or expensive post-combustion exhaust gas treatment. To avoid such undesirable emissions, and thereby to avoid the cost associated with post combustion treatment of the exhaust gas 14, the power plant 10 provides for staged in-situ combustion of the fuel 18. In the embodiment of FIG. 1, the topping cycle 12 includes a first stage of dry low NOx combustion 24 provided by an integrated torus-configured combustor chamber 20 and first stage vane 22. One such integrated combustor/first stage vane configuration is described in U.S. Pat. No. 6,796,130, which is incorporated by reference herein. This design is simple, efficient and compact when compared to other known low-emission combustor designs.

The topping cycle 12 of plant 10 also provides a second stage of combustion 26 and a third stage of combustion 28 in the form of in-situ re-heat combustion associated with the respective second row of vanes 30 and third row of vanes 32. The fuel 18 consumed in the second and third stages of combustion 26, 28 may be introduced through the trailing edge or at other appropriate locations associated with the flow of the combustion gas over the vanes 30, 32. Thus, each of the stages of combustion 24, 26, 28 of the present combined cycle power plant 10 is integrated within the topping cycle gas turbine engine 34 to provide a simple, compact combustion mechanism; unlike the large, discrete reheat burners described in the prior art '953 patent.

In-situ reheat combustion has previously been studied as an alternative to the traditional discrete reheat combustors for gas turbine applications under U.S. Department of Energy (DOE) Contract No. DE-FC26-00NT40913. In that study, only single stage reheat via the first row of vanes was found to have merit. In spite of such teaching, the combined cycle power plant 10, the present inventor has discovered that by providing in-situ reheat combustion in both the second and third rows of vanes 30, 32, it is possible to reduce the life cycle costs of the plant 10 when compared to the prior art single stage in-situ reheat arrangement encouraged by the above-mentioned DOE study. This comes about because the peak firing temperature may be limited to about 1,400° C. by providing multi-staged in-situ reheat combustion, while still providing a desirably high exhaust gas temperature of about 640° C. for optimal bottoming cycle efficiency. An adequate number of expansion stages is provided downstream of the fueled vanes 30, 32 to ensure that all fuel energy is released. In the illustrated embodiment of FIG. 1, an additional two downstream stages of blades and vanes are provided, although in other embodiments other stages of expansion may be used. The limited peak combustion temperature also minimizes the production of oxides of nitrogen and precludes the need for costly post-combustion exhaust treatment. Combustion at 1,700° C. may typically produce about 50 ppm of NOx, thereby requiring post-combustion treatment for most locations in the United States. However, combustion at 1,400° C. may typically produce only about 3 ppm of NOx, which may be acceptable for release to the atmosphere without the expense and availability problems associated with post-combustion exhaust treatment. Furthermore, a firing temperature of only 1,400° C. allows the hot gas path components to be formed of superalloy steels rather than ceramic matrix composite materials, if desired, and/or with a reduced need for exotic cooling schemes and/or ceramic thermal barrier coating materials, thereby further limiting both the manufacturing and maintenance costs of these components.

Aspirated compressors have been studied since about 1993 for application to military jet engines. An aspirated compressor is one wherein compressor performance is improved by removing about 1-4% of the flow from the boundary layer at critical locations within the compressor in order to avoid boundary layer separation. Aspirated compressors provide a desired degree of compression with a greatly reduced number of stages when compared to non-aspirated designs. Aspirated compressors have been developed under research funded by the United States Air Force, since the size and weight reductions provided by an aspirated design have obvious advantages in airborne applications. The present inventor has recognized that an aspirated compressor may provide important life cycle cost advantages for land-based power generation applications, due to the reduced number and size of the rotating components, and thus the compressor 36 of topping cycle gas turbine engine 34 may be an aspirated compressor. The air that is bled from the compressor 36 may be used for cooling and/or sealing purposes in lower pressure portions of the gas turbine engine 34 during normal operation. Compressor 36 may further incorporate variable-pitch vanes, thereby eliminating the need for a compressor bleed system that would otherwise be necessary only for start-up operation. Gas turbine engine 34 may be connected to an electrical generator 38 for providing electrical power to a grid.

Gas turbine 34 incorporates features that operate synergistically to minimize total plant life cycle cost by not only providing a compact, economical, efficient, low emission topping cycle 12, but by also providing exhaust gas 14 to the associated bottoming cycle 16 at a temperature favorable for overall plant efficiency, while at the same time maintaining the peak combustion temperature low enough for extended hot gas path component life. The present invention goes against modern gas turbine engine design philosophy that has resulted in ever-increasing firing temperatures in the blind pursuit of gas cycle thermal efficiency. Peak firing temperatures for commercial land-based gas turbine power plant engines were about 1,400° C. in the early 1990's. Since then, a series of engine designs have been introduced by each of the major gas turbine vendors that have pushed peak firing temperatures well past 2,000° C., being limited only by the availability of new high temperature materials and exotic cooling schemes. The present invention avoids the high cost associated with such ultra-high temperature materials which not only cost more to manufacture but also may require more frequent in-service inspections and tend to have a relatively higher in-service failure rate. The present invention may enable an approximate 10% reduction in total life cycle cost when compared to current combined cycle plant designs.

Figure 2:
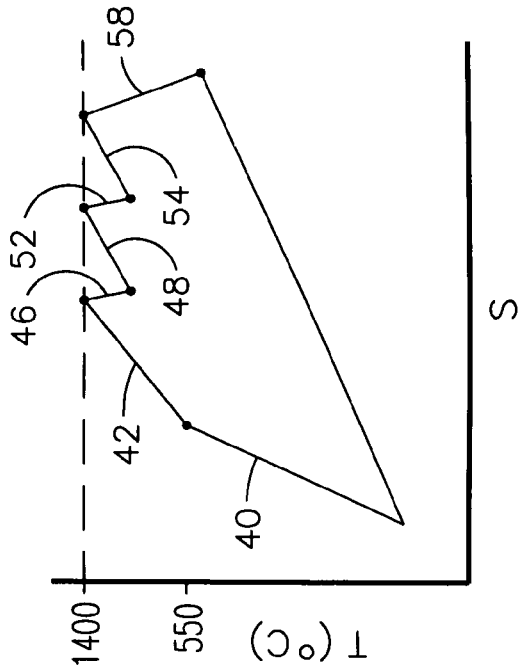
FIG. 2 is an exemplary T/S diagram for the topping cycle of the power plant of FIG. 1.

The performance of an exemplary gas turbine engine 34 incorporating multiple in-situ reheat stages is illustrated in FIG. 2. Initial compression occurs in the aspirated compressor 36 along line 40 to a temperature of about 550° C. The first stage of combustion 24 raises the temperature of the working fluid to about 1,400° C. along line 42. Work is then expended through the first row of rotating blades 44 along line 46. The second stage of combustion 26 raises the working gas temperature back to about 1,400°0 C. along line 48. Additional work is expended through the second row of rotating blades 50 along line 52. The third stage of combustion 28 again raises the working gas temperature to about 1,400° C. along line 54 prior to the working fluid expending work through the remaining rows of blades 56 along line 58. The inherent efficiency of this cycle may be appreciated by considering its similarity to an Erickson cycle, which is known to be an efficient gas cycle. With an engine pressurization ratio (PR) of approximately 40:1, a peak firing temperature of about 1,400° C., and an exhaust gas 14 temperature of about 640° C., the combined cycle net efficiency (LHV) of power plant 10 is expected to be in the mid-60% range, and the plant is expected to produce exhaust gas with no more than about 3 ppm of NOx. Importantly, this thermally efficient design is achieved in a plant having relatively low manufacturing and maintenance costs when compared to prior art combined cycle plants, and low operating cost due to its efficiency and lack of need for post-combustion exhaust treatment.

Figure 3:
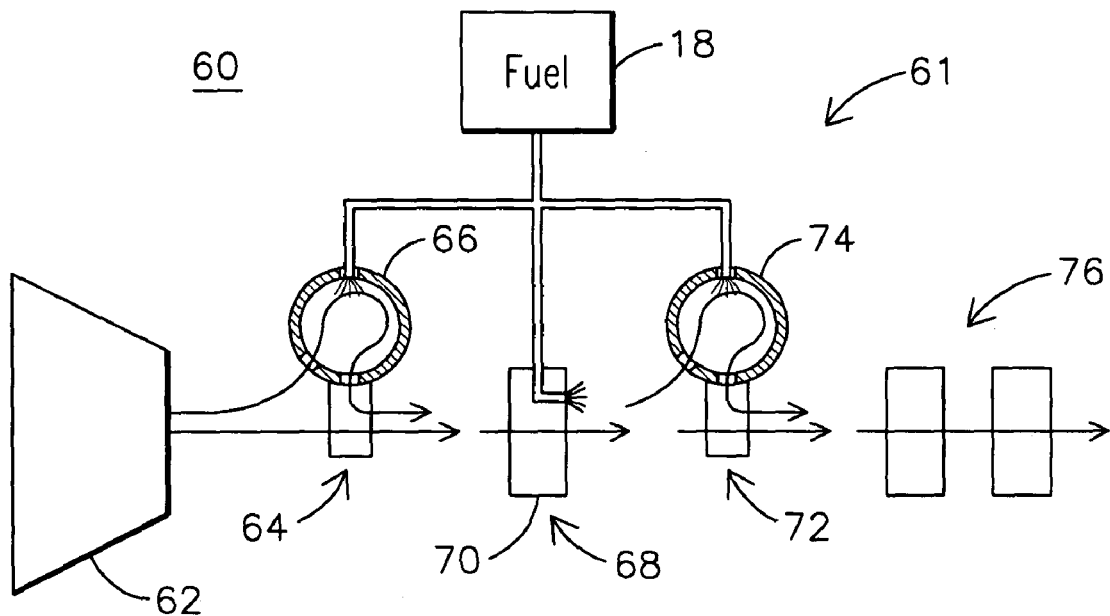
FIG. 3 is a schematic illustration of an alternative gas turbine engine design that may be used in the power plant of FIG. 1.

FIG. 3 illustrates an alternative embodiment of a gas turbine engine 60 that may be utilized in an improved combined cycle power plant such as plant 10 of FIG. 1. Engine 60 includes a compressor 62 and multiple stages of combustion integrated with an expansion turbine 61 (rotating components not illustrated). In this embodiment, the first stage of combustion 64 is an integrated torus combustor/vane arrangement 66 as described in U.S. Pat. No. 6,796,130. A second stage of combustion 68 is provided by in-situ reheat combustion associated with a second turbine stage 70. A third stage of combustion 72 is provided by a second integrated torus combustor/vane arrangement 74. Additional turbine stages 76 are provided downstream of the third stage of combustion 72. This design is similar to that of engine 34 of FIG. 1, except that the third stage of combustion 72 is provided by the torus combustor/vane arrangement 66 rather than the in-situ combustion stage 28 of FIG. 1, and it may be preferred in some embodiments in order to assure complete combustion at the lower temperatures and pressures associated with the third stage and further downstream turbine stages 76.

Figure 4:
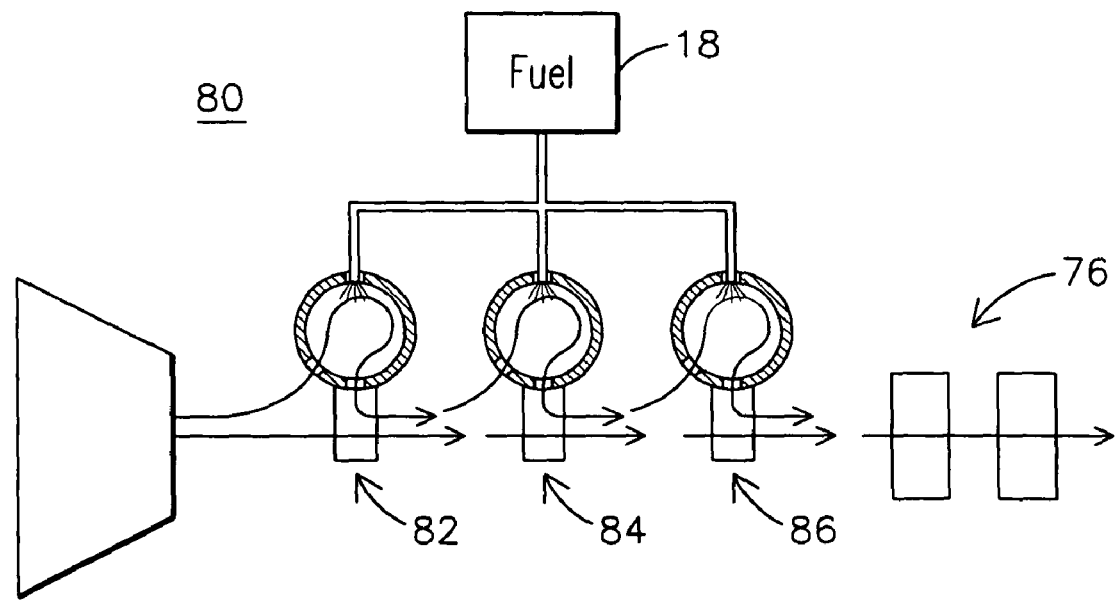
FIG. 4 is a schematic illustration of an alternative gas turbine engine design that may be used in the power plant of FIG. 1.

The various stages of reheat may be provided by any combination of fuel combustion directly in the combustion gas flow path and/or integrated combustor/vane arrangements in various embodiments. FIG. 4 illustrates a further embodiment of a gas turbine engine 80 (rotating components not illustrated) that uses integrated combustor/vane arrangements 82, 84, 86 for three consecutive stages of combustion; i.e. primary combustion 82 and two stages of reheat combustion 84, 86. The selection of a particular combustion/reheat design for a particular application may be guided by a total plant life cycle cost evaluation.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. In a combined cycle power plant comprising a gas topping cycle for combusting a fuel to produce shaft power and an exhaust gas and a steam bottoming cycle receiving the exhaust gas to produce additional shaft power, the gas topping cycle comprising:
    an aspirated compressor for providing a flow of compressed air;
    an integrated torus-configured combustion chamber and turbine first stage vane for combusting fuel in the compressed air to produce combustion gas;
    a plurality of turbine stages downstream of the first stage vane for expanding the combustion gas to extract shaft power and to produce the exhaust gas; and
    a means for reheating of the combustion gas associated with at least one of the plurality of turbine stages downstream of the first stage vane;
    wherein said means is configured to limit a peak combustion temperature of the combustion gas to no more than a threshold temperature of about 1,400° C., said threshold temperature based on a maximum desired level of nitrogen oxide in the exhaust gas.

2. In the combined cycle power plant of claim 1, the means for in-situ reheating further comprising:
    a fuel supply delivering fuel to a second turbine stage for release into the combustion gas; and
    a fuel supply delivering fuel to a third turbine stage for release into the combustion gas.

3. In the combined cycle power plant of claim 1, the means for in-situ reheating further comprising:
    a fuel supply delivering fuel to a second turbine stage vane for release into the combustion gas; and
    a fuel supply delivering fuel to a third turbine stage vane for release into the combustion gas.

4. In the combined cycle power plant of claim 1, the gas topping cycle effective to limit a peak combustion temperature of the combustion chamber to no more than about 1,400° C.

5. In the combined cycle power plant of claim 4, the gas topping cycle effective to provide the exhaust gas to the bottoming cycle at a temperature of about 640° C.

6. In the combined cycle power plant of claim 1, wherein the maximum desired level of nitrogen oxide in the exhaust gas is 3 parts per million.

7. A combined cycle power plant comprising:
    a steam bottoming cycle receiving exhaust gas from a gas turbine topping cycle, the gas turbine topping cycle comprising:
    an aspirated compressor producing compressed air;
    a torus-configured combustion chamber associated with a first stage of an expansion turbine;
    a stage of in-situ combustion associated with a second stage of the expansion turbine;
    a third stage of combustion associated with a third stage of the expansion turbine; and
    a number of stages of the expansion turbine disposed downstream of the third stage of combustion sufficient to ensure that all fuel energy is released within the expansion turbine;:
    wherein said stages are configured to maintain a temperature of combustion gas at no more than a threshold temperature of about 1,400° C., said threshold temperature based on a maximum desired level of nitrogen oxide in the exhaust gas.

8. The combined cycle power plant of claim 7, wherein the third stage of combustion comprises in-situ combustion.

9. The combined cycle power plant of claim 7, wherein the maximum desired level of nitrogen oxide in the exhaust gas is 3 parts per million.

* * * * *